Figure 1:
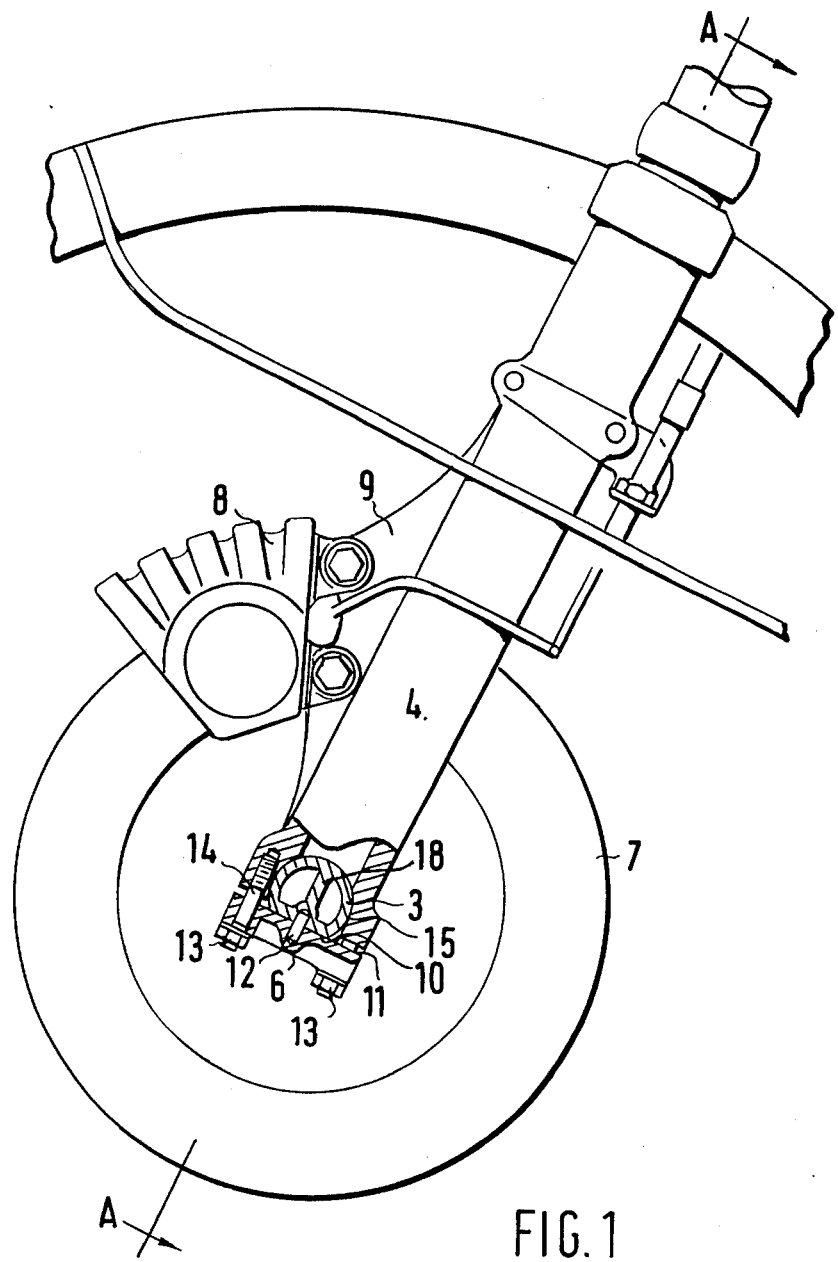

United States Patent [19]
Bauer

[11] 3,989,262
[45] Nov. 2, 1976

[54] MOTORCYCLE WITH BRAKE TORQUE TRANSMITTING WHEEL MOUNTING SPINDLE

[75] Inventor: Stefan George Bauer, Hilton, England

[73] Assignee: Norton Villiers Triumph Limited, London, England

[22] Filed: May 22, 1975

[21] Appl. No.: 579,913

[30] Foreign Application Priority Data
May 23, 1974 United Kingdom............... 22037/74

[52] U.S. Cl. ............................................... 280/279
[51] Int. Cl.² ......................................... B62K 21/02
[58] Field of Search ........................ 280/279, 11.23; 301/125, 132; 74/242.14

[56] References Cited
UNITED STATES PATENTS
3,521,904   7/1970   Sheffer ............................ 280/279 X
3,610,659   10/1971   Gerarde ............................. 280/279

*Primary Examiner*—M. H. Wood, Jr.
*Assistant Examiner*—Terrance L. Siemens
*Attorney, Agent, or Firm*—Norris & Bateman

[57] ABSTRACT

A motor cycle having brake means mounted on one leg of a steerable front wheel fork for cooperation with a disc or like brake element rotatable with a wheel element mounted by bearings on a torsionally stiff brake torque reaction transmitting spindle that has its ends positively non-rotatably clamped in the fork legs.

9 Claims, 3 Drawing Figures

MOTOR CYCLE WITH BRAKE TORQUE TRANSMITTING WHEEL MOUNTING SPINDLE

This invention relates to motor cycles and in particular relates to the mounting of steerable front wheels in motor cycles.

A motor cycle front wheel is conventionally rotatably mounted on a spindle which is located between the free ends ot two parallel legs of a fork, which fork is pivotally secured to a frame of the motor cycle for steering movement of the front wheel. With such an arrangement a problem arises due to the asymmetry of a conventional braking system in which a braked member mounted on the hub of the wheel is braked by a braking member secured to one of the fork legs. The braked member will be a drum or a disc secured to the wheel hub and the braking member will be brake shoes carried by a plate, or brake pads carried by an actuating caliper, respectively, the plate or caliper being secured to one of the fork legs. When the brake is applied a torque reaction acting about the wheel axis is exerted on the fork leg to which braking member, is secured. This torque reaction results in the bending of the fork leg to which the braking member is secured whilst the other leg, not being subjected to the torque reaction, remains straight and hence results in a steering disturbance as well as an excessive stress in the bent leg.

It is an object of the present invention to provide a means of eliminating or reducing the aforesaid problem.

According to the invention a motor cycle comprises a front wheel rotatably mounted on a torsionally stiff spindle which is located between the free ends of the parallel legs of a fork, each end of the spindle being located in an end of a fork leg in a positive non-rotational manner. By "positive non-rotational manner" is meant a location method which does not rely purely on frictional clamping of the spindle to prevent its rotation.

When the front wheel of a motor cycle according to the invention is fitted with an asymmetric braking arrangement in which a brake drum or disc secured to the hub is braked by brake shoes carried by a plate or brake pads carried by a caliper, respectively, the plate or the caliper being secured to one of the fork legs, the spindle acts to ensure that the braking reaction torque acts on both fork legs. The spindle acts in this manner because it is torsionally stiff and is positively located in each fork leg and thereby serves as a torsion transmitting member between the two fork legs and transmits the braking reaction torque from the fork leg to which the brake plate or caliper is secured to the other fork leg. The braking reaction torque therefore acts equally on both fork legs and there is little or no tendency for one fork leg to distort relatively to the other.

The spindle is preferably given the required torsional stiffness by making it of tubular shape with an outside diameter considerably greater than that of a conventional spindle. The spindle is preferably positively located in each fork leg in a non-rotational manner by forming the ends of the spindle with non-circular cross-sectional shapes and, for example, each end of the spindle may have one or more flat surfaces formed parallel to the axis of the spindle. The fork legs will have housings for the ends of the spindle which have complementary non-circular shapes. It is known to secure the circular cross-sectional shaped free ends of the fork legs by some form of clamping means but such a securement method does not constitute a "positive non-rotational" method within the meaning applied to this phrase in this specification because it is not possible to obtain high enough clamping loads with conventionally used materials, such as aluminium alloys, to prevent slight rotation of a circular spindle.

In a known arrangement for securing a spindle to the ends of the fork legs, the end of each fork leg has a clamping plate secured thereto and the end of the fork leg and the clamping plate have mating semi-circular grooves therein which together form a circular aperture or housing in which an end of the spindle locates, the clamping plate thereby clamping the spindle to the end of the fork leg. A similar arrangement may be utilised to secure the spindle of a motor cycle according to the invention and, for example, the clamping plate instead of having a semi-cicular goove therein may have a flat clamping surface which is clamped against a mating flat surface formed at the end of the spindle. The clamping plate may be so disposed that any normal machining inaccuracies can be compensated for and the wheel spindle be clamped so that the fork legs are in correct geometric alignment. Preferably the flat mating surfaces of the clamping plate and the spindle have aligned perpendicular bores therein in which a locating peg is positioned, which peg acts to locate the spindle lengthwise.

Figure 2:
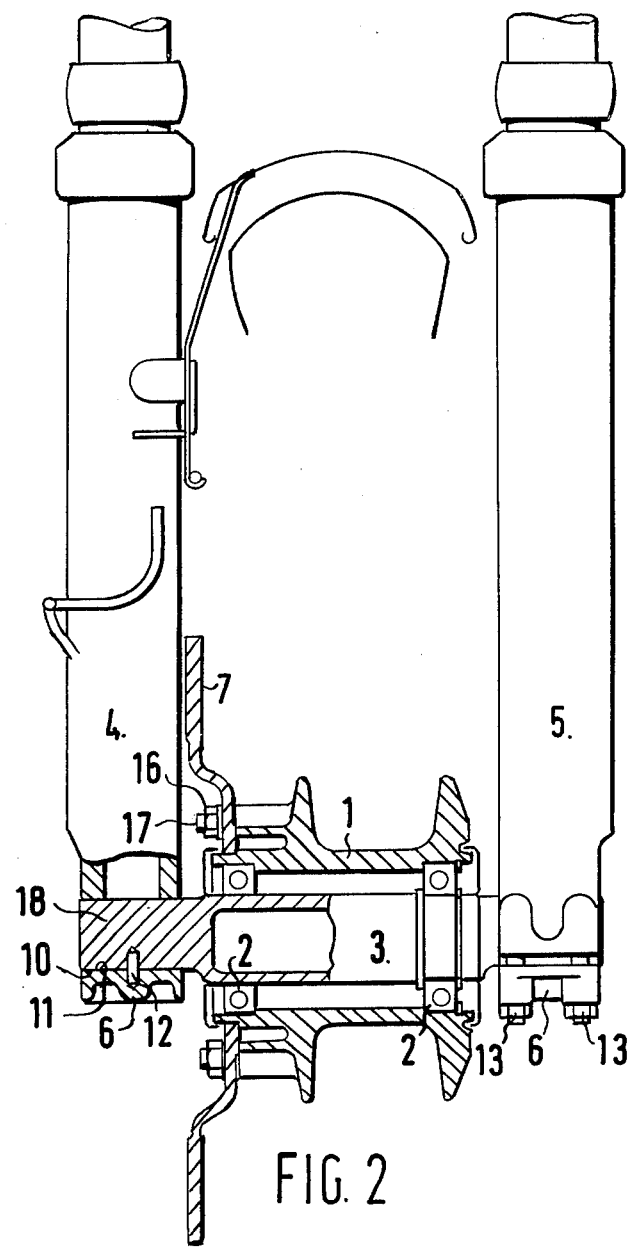
Figure 3:
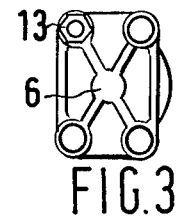

A preferred embodiment of the invention will be described, by way of example, with reference to the accompanying drawings in which:

FIG. 1 is a part side view of a motor cycles front fork and wheel assembly according to the invention, FIG. 2 is an axial cross-section through the wheel hub along the line A—A in FIG. 1, and FIG. 3 is an underneath plan view of a clamping plate.

The front wheel of the motor cycle comprises a hub 1 which is rotatably mounted by bearings 2 on a tubular spindle 3 which is mounted between the free ends of parallel telescopic fork legs 4 and 5, the front wheel fork being pivotally mounted on the frame of the motor cycle (not shown) in conventional manner. A brake caliper 8 is secured by a bracket 9 to the fork leg 4 and is hydraulically operable to apply a braking force to a brake disc 7 which is secured to the hub 1 by nuts 16 screwed on to studs 17. Each end of the spindle 3 is basically of D-shape, that is circular cross-section but with a chordal flat surface 10 formed thereon, and has a diametrically extending internal strengthening wall 18. A clamping plate 6 is secured to the end of each of the fork legs 4 and 5 by nuts 13 which are screwed on to the studs 14 screwed into the end of the fork legs. The ends of the spindle 3 are located in the grooves 15 in the ends of the forks 4 and 5 with the flat surfaces 10 thereon parallel to the ends of the forks 4 and 5 and abutted by the mating flat surfaces 11 of the clamping plates 6. The spindle is located axially at each end thereof by a peg 12 which locates in perpendicular aligned bores in the flat surfaces 10 and 11. Alternatively a bolt could be employed to hold each clamping plate 6 to the spindle instead of using the loose pegs 12. The spindle 3 is of comparatively large diameter, typically being of the order of 1½ inches in diameter as compared with a conventional solid spindle which is usually about ⅝ inch in diameter, and is therefore torsionally stiff. This fact, in conjunction with the positive non-rotational clamping of the ends of the spindle 3 by the clamping plates 6 ensures that the braking reaction torque exerted on the fork leg 4 is transmitted by the spindle 3 to the fork leg 5, thus ensuring that the fork leg 4 does not distort relative to the fork leg 5.

It will be apparent to one skilled in the art that means other than that described above may be utilised to positively locate the ends of the spindle in the ends of the fork legs in a manner which would prevent any rotational movement of the spindle relative to the fork legs.

Whilst the primary intention in using a torsionally stiff wheel spindle which is positively clamped at its ends is to eliminate or reduce the adverse effects of the braking torque reaction, a subsidiary advantage arises from the fact that the spindle and its fixing will usually also be stiff in bending as well as in torsion. This stiffness to bending results in the front wheel fork assembly being more rigid in the roll axis direction and thus the stability of the steering is further enhanced.

What I claim is:

1. A motor cycle comprising a pivotally mounted steerable front wheel fork having parallel legs, a torsionally stiff tubular wheel spindle extending between the lower free ends of the fork legs, each end of the spindle being of non-circular cross-sectional shape, means rotatably mounting a front wheel hub on said spindle, a brake element rotatable with said hub, brake means mounted on one of said legs disposed for operative coaction with said brake element, and means for positively clamping the ends of the spindle non-rotatably to said fork legs whereby when said brake means is actuated the resultant brake torque reaction effective on said one leg is transmitted by said spindle to be shared by said other leg.

2. The motor cycle defined in claim 1, wherein said brake element is a disc, and said brake means is of the caliper type.

3. The motor cycle defined in claim 2, wherein said clamping means comprises a clamp plate secured across the lower end of each leg in contact with a flat surface on the spindle end.

4. The motor cycle defined in claim 1, wherein means is provided on the lower ends of said legs for radially clamping said spindle ends directly upon said legs.

5. A motor cycle comprising a pivotally mounted steerable front wheel fork having parallel legs, a torsionally stiff tubular wheel spindle extending between the free ends of the fork legs, housing means in each of the fork legs accommodating an end of the spindle, each end of the spindle and said housing means being of complimentary non-circular cross-sectional shape, and means for applying a radial clamping force on each end of the spindle relative to the housing means, and means for mounting a front wheel on the spindle.

6. The motor cycle defined in claim 5, wherein each end of said spindle has a flat transverse surface disposed within the housing means, and said housing means is defined by a spindle end embracing recess in each fork leg and a clamping plate extending across said recess and having a flat surface adapted to tightly engage the flat surface on said spindle.

7. The motor cycle defined in claim 6, wherein said clamping plates are secured to the lower ends of said legs by threaded fastening devices that extend between each said plate and associated leg and are tightened to ensure positive clamping of said spindle ends.

8. A motor cycle comprising a pivotally mounted steerable front wheel fork having parallel legs, a torsionally stiff tubular torque transmitting spindle extending between the free ends of the fork legs, each end of the spindle having at least one flat surface formed parallel to the axis of the spindle, housing means in each of the fork legs accommodating an end of the spindle, each housing means having a complimentary flat surface arranged to abut each said flat surface on the end of the spindle, said housing means comprising a clamping member and means for moving each clamping member radially relative to the spindle to clamp an end of the spindle within the associated housing means, and a front wheel member rotatably mounted on the spindle.

9. A motor cycle according to claim 8, wherein each end of the spindle is of 'D' cross-sectional shape and each housing comprises a 'U'-shaped surface and a flat surface, one of said surfaces being carried by a fork leg and the other being carried by the clamping member, and said clamping member being secured to the fork leg in such manner that an end of the spindle is clamped between the clamping member and the fork leg with the flat surfaces at the end of the spindle and on the housing in abutment.

* * * * *

UNITED STATES PATENT OFFICE
CERTIFICATE OF CORRECTION

PATENT NO. : 3,989,262
DATED : November 2, 1976
INVENTOR(S) : Stefan George Bauer It is certified that error appears in the above-identified patent and that said Letters Patent are hereby corrected as shown below:

In the Priority data, change "22037/74" to --23037/74--.

Signed and Sealed this

Fifteenth Day of February 1977

[SEAL]

Attest:

RUTH C. MASON
*Attesting Officer*

C. MARSHALL DANN
*Commissioner of Patents and Trademarks*